United States Patent
Caprioli et al.

(10) Patent No.: US 7,480,787 B1
(45) Date of Patent: Jan. 20, 2009

(54) METHOD AND STRUCTURE FOR PIPELINING OF SIMD CONDITIONAL MOVES

(75) Inventors: Paul Caprioli, Mountain View, CA (US); Lawrence A. Spracklen, Boulder Creek, CA (US); Sherman H. Yip, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 95 days.

(21) Appl. No.: 11/341,001

(22) Filed: Jan. 27, 2006

(51) Int. Cl.
*G06F 9/00* (2006.01)
(52) U.S. Cl. .......................... 712/224; 712/5
(58) Field of Classification Search ............ 712/5, 712/22, 224
See application file for complete search history.

(56) References Cited

U.S. PATENT DOCUMENTS

| | | | | |
|---|---|---|---|---|
| 6,052,769 A | * | 4/2000 | Huff et al. | 712/3 |
| 6,122,730 A | * | 9/2000 | Kitade | 712/234 |
| 6,173,393 B1 | * | 1/2001 | Palanca et al. | 712/224 |
| 6,484,255 B1 | * | 11/2002 | Dulong | 712/224 |
| 2002/0002666 A1 | * | 1/2002 | Dulong et al. | 712/224 |
| 2005/0289329 A1 | * | 12/2005 | Dwyer et al. | 712/234 |

OTHER PUBLICATIONS

Nation, Wayne G.; Fineberg, Samuel A.; Allemang, Mark D.; Schwederski, Thomas; Casavant, Thomas L.; Siegel, Howard Jay. "Efficient Masking Techniques for Large-Scale SIMD Architectures". IEEE © 1990. pp. 259-264.*

Narayanan, P.J. "Processor Autonomy on SIMD Architectures". ACM International Conference on Supercomputing: Proceedings of the 7th International Conference on Supercomputing. © 1993. pp. 127-136.*

* cited by examiner

*Primary Examiner*—Aimee J Li
(74) *Attorney, Agent, or Firm*—Gunnison, McKay & Hodgson, L.L.P.; Forrest Gunnison

(57) ABSTRACT

A mask is first generated in a general-purpose integer register. The mask is generated by executing a single instruction multiple data (SIMD) instruction on a plurality of operands stored in a plurality of registers and by writing the result to the general-purpose integer register. Next, a conditional-move mask is generated in a register using the mask, and then the conditional-move mask is used in selecting operands from the plurality of operands to generate a result in another register.

14 Claims, 8 Drawing Sheets

METHOD AND STRUCTURE FOR PIPELINING OF SIMD CONDITIONAL MOVES

BACKGROUND OF THE INVENTION

1. Field of the Invention

The present invention relates generally to SIMD processing, and more particularly to SIMD operations utilizing register operations only.

2. Description of Related Art

Those of skill in the art are familiar with single instruction multiple data (SIMD) architectures. The instructions in the instructions sets used with these architectures operate on a plurality of operands with the same operation.

For example, floating point registers FP0, FP1 (FIG. 1) are used to store source operands A0 to An, and B0 to Bn, respectively. For a particular function op, each source operand A_s, where s ranges from 0 to N, in register FP0 interacts with an identically positioned source operand B_s, where s ranges from 0 to N, in other register FP1 to produce a result, that is stored in a corresponding location in result register R. For example, a function op is performed on source operand A0 and source operand B0 and result A0opB0 is placed in a corresponding location in register R.

One of the functions op that was used in the prior art was a compare function. Typical compare functions were "greater than," "less than or equal to," "equal," "not equal," "less than," and "greater than or equal to." FIG. 2A is an illustration of a compare operation for 16-bit source operands A0 to A3 and B0 to B3 in 64-bit floating point registers FP0 and FP1, respectively.

For any one of the compare functions in FIG. 2, operand A0 is compared with operand B0 and if the comparison is true, bit 3 in result register R is set to one, and if the comparison is false bit 3 is set to zero. Thus, the result of the comparison operation is available in bits zero to 3 of register R. Equivalent operations are defined for 32-bit source operands and 8-bit source operands.

Another prior art function was the maximum function, which selected the maximum of two source operands and placed the result in the corresponding location in the result register. One way to implement the maximum function is given in Table 1.

TABLE 1

| | |
|---|---|
| cmpgt32 | FP0, FP1, MASK |
| store | FP1, [Address] |
| partial store | FP0, [Address], MASK |
| ldf | [Address], R |

As illustrated in FIG. 3A, execution of compare instruction fcmpgt32 compares operand A0 in register FP0 with operand B0 in register FP1. If operand A0 is greater than operand B0, bit one in register MASK is set to 1 and otherwise to zero. Similarly, if operand A1 is greater than operand B1, bit zero in register MASK is set to 1 and otherwise to zero. For purposes of an example, assume that operand A0 is greater than operand B0 and operand A1 is not greater than operand B1. For this example, register MASK stores "10" in bits one and zero, respectively.

Instruction store (Table 1) stores the value in register FP1 at location [Address]. (See FIG. 3B). Instruction partial store used the values in register MASK to determine which operands in register FP0 to store in location [Address].

In this example, a bit that is one in register MASK indicates that the corresponding operand in register FP0 is the largest. For each one in register MASK, the corresponding operand in register FP0 is stored in the corresponding location at location [Address]. In this example, operand A0 is stored as illustrated in FIG. 3C.

Instruction ldf loads the value at location [Address] in result register R. Thus, determining the maximum required a scratch memory location and three memory operations, which are undesirable.

One approach to reducing the memory operations was to write the result of the compare function to a special graphics condition codes register gcc. To take advantage of register gcc, a new conditional move instruction cmove was defined that used register gcc. The instruction sequence in TABLE 2 obtains the same result as the instruction sequence in TABLE 1.

TABLE 2

| | |
|---|---|
| cmpgt32 | FP0, FP1 |
| cmove32 | FP0, FP1, R |

In this example, instruction fcmpgt32 does the operand by operand comparison, as described above, and configures a corresponding bit of register gcc based upon the result of the comparison of each pair of operands. Instruction cmove32 used register gcc as a mask and if a bit in register gcc is a one moves the corresponding operand from register FP0 into the corresponding location in register R and if the bit is a zero, moves the corresponding operand from register FP1 into the corresponding location in register R. See FIG. 4. Thus, the memory accesses and the scratch memory requirement associated with the operations associated with the execution of the computer program instructions of Table 1 have been replaced with register operations and a corresponding enhancement in performance.

While the use of instruction cmove with register gcc enhanced performance, in some situations, a bottleneck developed. Consider the following computer code segment:

cmpxx X1, Y1
cmpxx X2, Y2
cmpxx X3, Y3
cmpxx X4, Y4
cmpxx X5, Y5
cmov X1, Y1 where xx is any of the comparisons described above, e.g., "greater than," "less than or equal to," "equal," "not equal," "less than," and "greater than or equal to."

For illustration purposes, assume instruction cmpxx has a five-cycle latency. Once instruction cmpxx X1, Y1 is started, none of the other compare instructions can start until instruction cmov completes. The other compare instructions are stalled waiting for register gcc to become available.

SUMMARY OF THE INVENTION

The prior art bottleneck associated with the single graphic conditions code register and the requirements for multiple memory transactions and scratch memory are all eliminated by one embodiment of this invention. This embodiment permits software pipelining of SIMD operations, which results in enhanced performance over the prior art methods. In addition, the elimination of the graphics condition code register reduces line routing congestion on the chip.

In particular, a mask is first generated in an available register in a second plurality of registers on a processor. The mask is generated by executing a single instruction multiple data (SIMD) instruction on a plurality of operands stored in a first plurality of registers on the processor and by writing the result to the available register.

Next, a conditional-move mask is generated in another register using the mask, and then the conditional-move mask is used in selecting operands from the plurality of operands to generate a result in yet another register.

In one embodiment, the generating a conditional-move mask includes using a state of a bit in the mask to determine a state of a bit in a field of the conditional-move mask where the field of the conditional-move mask corresponds to the bit in the mask. The state of the bit in the corresponding field of the conditional-move mask is a logical inversion of the state of the bit in the mask.

In this embodiment, using the conditional-move mask in selecting operands from the plurality of operands to generate a result in another register includes copying an operand from one of the first plurality of registers to the yet another register based a value in a field of the conditional-move mask.

Since general-purpose integer registers are used to store the mask, in one embodiment, this allows software pipelining of SIMD compare instructions for example. In particular, a first SIMD compare instruction is executed for a first plurality of operands in a first register and a second plurality of operands in a second register. A result of the first SIMD compare operation is stored in a mask field of a first general-purpose integer register. Executing, concurrently with the first executing SIMD compare instruction, is a second SIMD compare instruction for a third plurality of operands in a third register and a fourth plurality of operands in a fourth register. A result of the second SIMD compare operation is stored in a mask field of a second general-purpose integer register. Thus, the execution of two SIMD compare instructions is pipelined.

DETAILED DESCRIPTION

Figure 1:
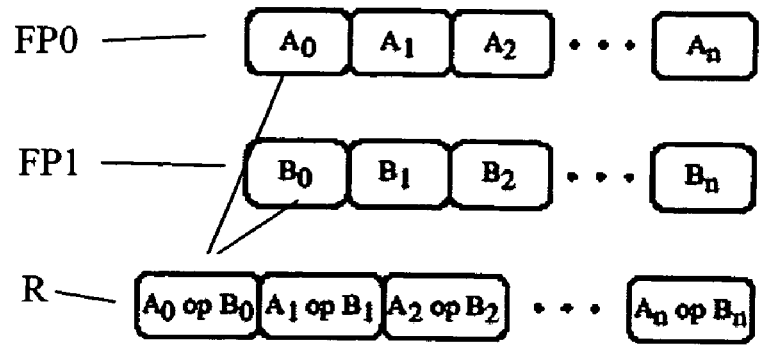
FIG. 1 illustrates an overview of the result obtained by executing a prior art SIMD instruction.
Figure 2:
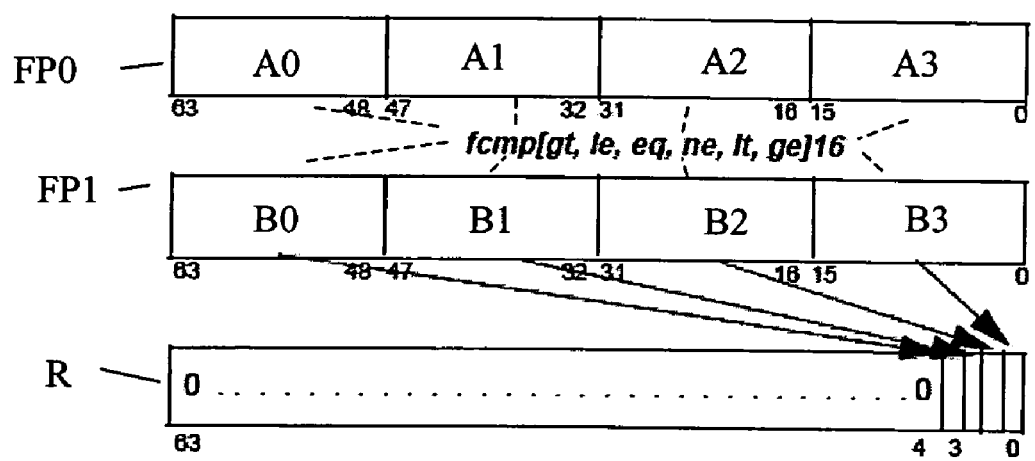
FIG. 2 illustrates an overview of the result obtained by executing a prior art SIMD compare instruction.
Figure 3A:
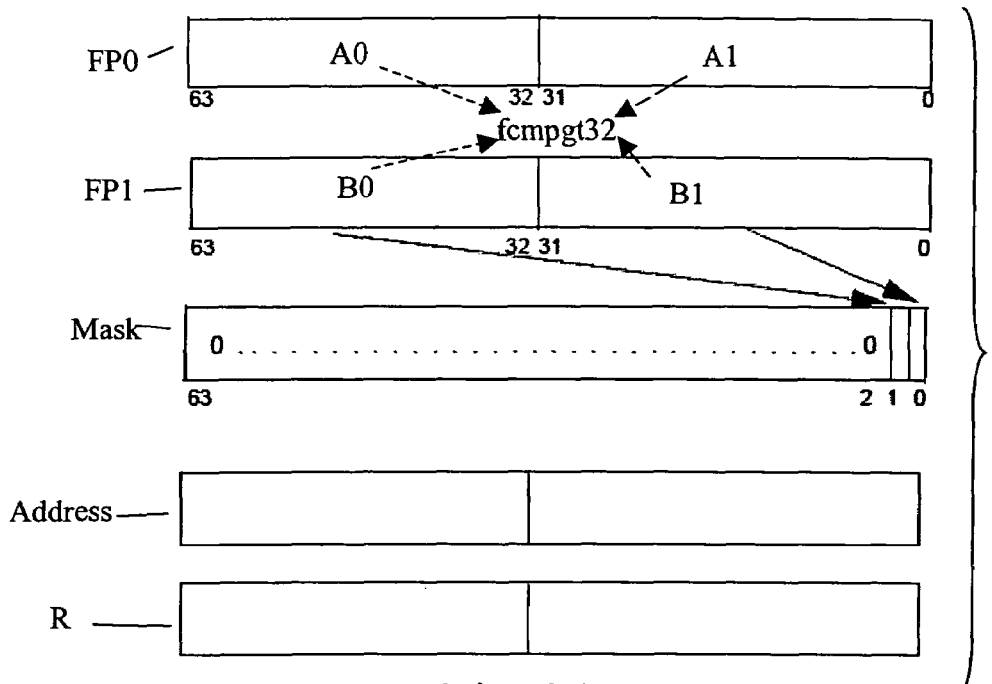
FIGS. 3A to 3C illustrates the various operations used in a prior art implementation of a maximum function.
Figure 3B:
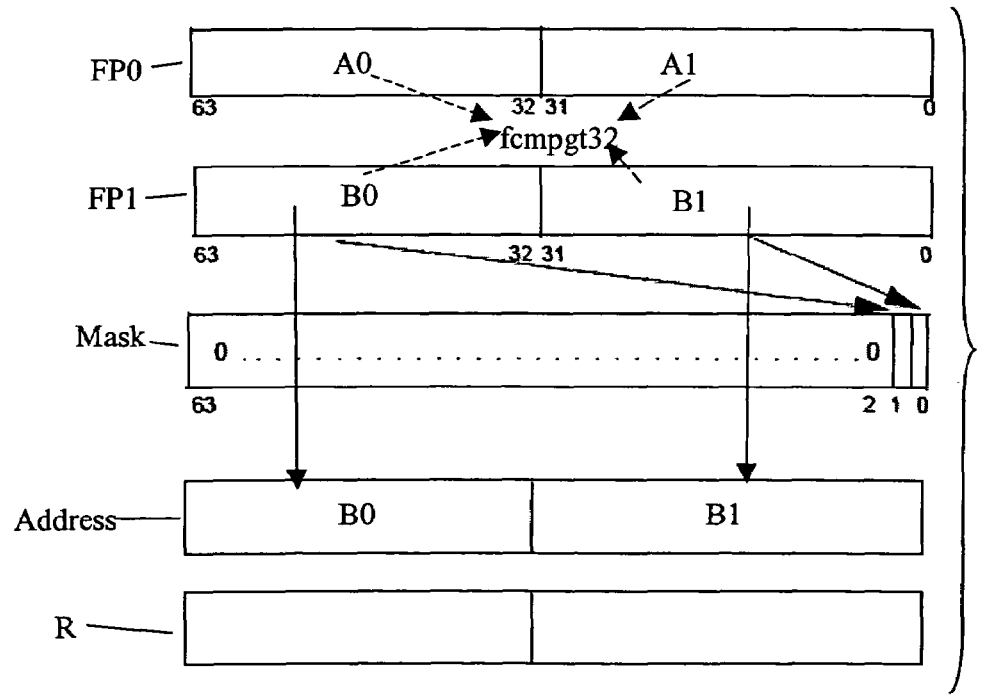
Figure 3C:
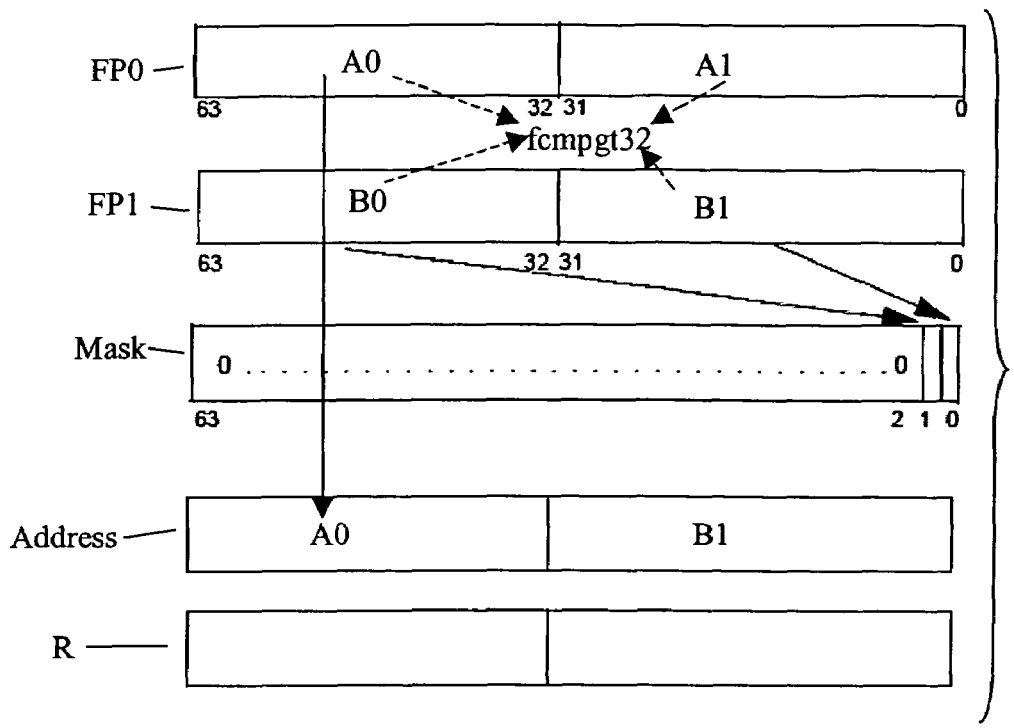
Figure 4:
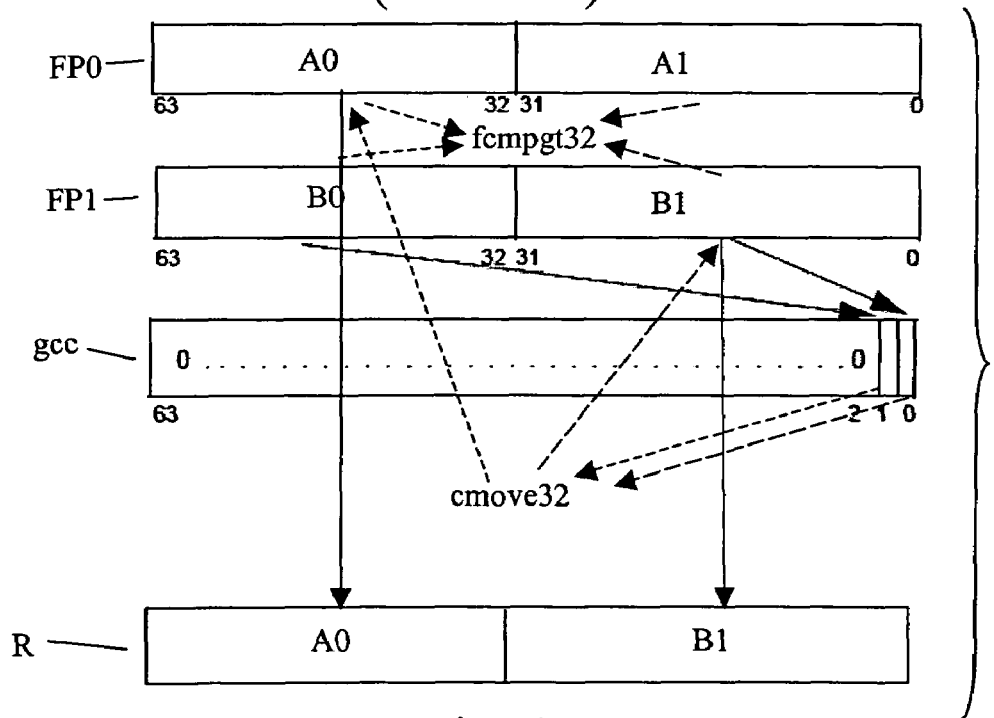
FIG. 4 illustrates a prior art improvement, over the method illustrated in over FIGS. 3A to 3C, of the implementation of the maximum function that utilizes a gcc register for a mask.

In one embodiment of the present invention, the shortcomings associated with the prior art comparisons in instruction sets for single instruction multiple data (SIMD) architectures are eliminated. In particular, the prior art bottleneck associated with the single graphic conditions code register and the requirements for multiple memory transactions and scratch memory are all eliminated. This permits software pipelining of SIMD operations, which results in enhanced performance over the prior art methods. In addition, the elimination of the graphics condition code register reduces line routing congestion on the chip.

As an example, consider a maximum function for 32-bit operands. A 32-bit comparison of operands packed in two floating-point registers FP0 and FP1 is first performed. (See FIG. 5A.)

In this example, floating point registers FP0 and FP1 are 64-bit registers. Source operands A0, A1 are packed in first floating point register FP0 and source operands B0, B1 are packed in a second floating point register FP1.

Floating point registers FP0 and FP1 are illustrative of a first plurality of registers on a processor that are used to store source operands. The use of floating point registers is illustrative only and is not intended to limit the invention to the use of such registers. In view of this disclosure, one of skill in the art can select an appropriate plurality of registers on a processor for storing the source operands so as to facilitate the process described more completely below.

In general, when a SIMD compare operation is performed on operands packed in a first plurality of registers, the result of the operation is written in a mask field of an available register in a second plurality of registers, such as, for example, a general-purpose integer register. For purposes of illustration of the maximum function, a 32-bit greater than comparison operation cmpgt32 is performed on operands A0, A1, B0 and B1 and the result is written to an integer mask IMASK in a general-purpose integer register I2.

Specifically, the result of the comparison of operand A0 with operand B0 (e.g., the result of the comparison of the first and third source operands, which are the most significant source operands) is written in bit 1 of integer mask IMASK, e.g., written to the most significant bit. The result of the comparison of operand A1 with operand B1 (e.g., the result of the comparison of the second and fourth source operands, which are the second most significant source operands which in turn, in this example, are the least significant source operands) is written in bit 0 of integer mask IMASK.

Unlike the prior art that utilized a single graphics condition code register for the mask that was generated by the SIMD operation, the integer mask is stored in one of the general-purpose integer registers. Since a processor has multiple general-purpose integer registers, the prior art bottleneck of waiting for the graphics code condition register to become available has been alleviated while still using only register operations.

Upon completion of the compare operation, a novel conditional-move mask operation is used. This operation is based upon the observation that prior art structures and instructions can be utilized efficiently in conjunction with the new conditional-move mask operation.

As described above, the compare operation generated integer mask IMASK in general-purpose integer register I2. Conditional-move mask instruction CMASK generates a conditional-move mask GSRMASK, using the value of integer mask IMASK, in a field gsr.mask of a register. The value in field gsr.mask is referred to as conditional-move mask GSRMASK. The generation of conditional-move mask GSRMASK is described more completely below.

In one embodiment, field gsr.mask is in a graphics status register, but the particular register used to store conditional-move mask GSRMASK is not essential to this invention. In view of this disclosure, one of skill in the art can select a register to store conditional-move mask GSRMASK that facilitates the usage of the mask as described herein so as to eliminate the prior art bottlenecks and requirements for scratch memory for example.

Herein, when it is stated that an instruction takes an action or uses information, those of skill in the art understand that such action or use is the result of execution of that instruction.

In this embodiment, execution of conditional-move mask instruction CMASK is configured to produce a conditional-move mask GSRMASK that can be used with a prior art instruction bshuffle. Accordingly, prior to considering the novel conditional-move mask operation further, it is helpful to consider this prior art instruction.

The VIS instruction set developed by Sun Microsystems, of Santa Clara, Calif., USA is known to those of skill in the art. The compare and other instructions discussed above in the Description of Related Art are included in the VIS instruction set.

One version of the VIS instruction set included a byte shuffle instruction bshuffle. Execution of a byte shuffle instruction bshuffle first concatenates the values in two floating-point registers, e.g., FP0 (more significant half) and FP1 (less significant half) to form a 128-bit (16-byte) value. Bytes in the concatenated value are numbered from most significant to least significant where byte 0 is the most significant byte.

After the concatenation, 8-bytes are extracted from the 16-byte concatenated value and stored in a 64-bit destination register FPresult using conditional-move mask GSRMASK. The bytes in destination register FPresult are also numbered from most to least significant with byte 0 being the most significant byte. Table 3 indicates which source byte is extracted from the concatenated value to generate each byte in floating point destination register FPresult.

TABLE 3

| Destination Byte (in FPresult) | Source Byte (in concatenated value) |
| --- | --- |
| 0 (most significant) | (FP0::FP1{gsr.mask{31:28}}) |
| 1 | (FP0::FP1{gsr.mask{27:24}}) |
| 2 | (FP0::FP1{gsr.mask{23:20}}) |
| 3 | (FP0::FP1{gsr.mask{19:16}}) |
| 4 | (FP0::FP1{gsr.mask{15:12}}) |
| 5 | (FP0::FP1{gsr.mask{11:8}}) |
| 6 | (FP0::FP1{gsr.mask{7:4}}) |
| 7 (least significant) | (FP0::FP1{gsr.mask{3:0}}) |

Figure 6:
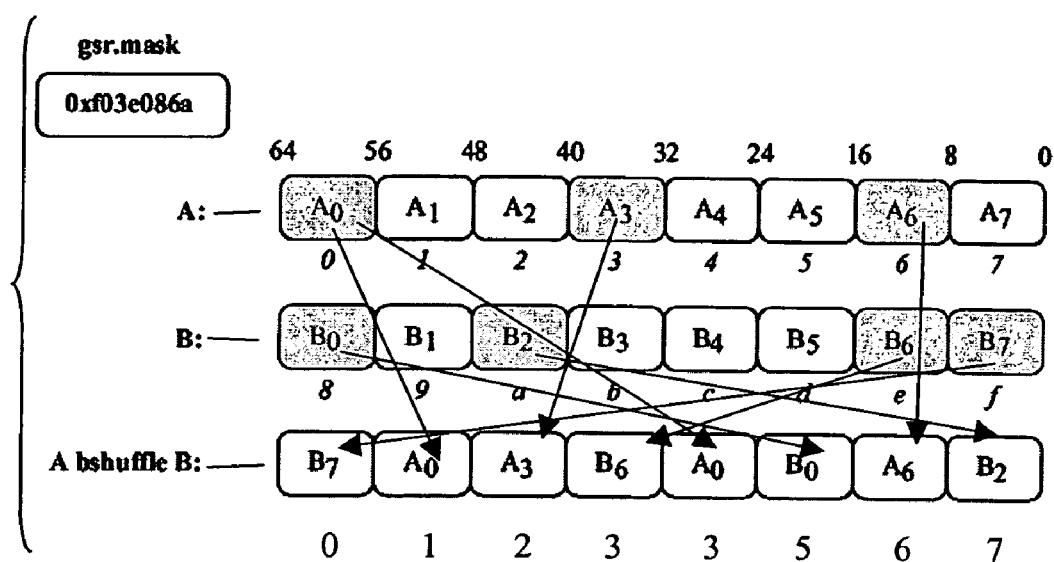
FIG. 6 is an illustration of a technique for using a conditional-move mask with instruction bshuffle.

FIG. 6 is an example of using instruction CMASK and instruction bshuffle. In FIG. 6, the execution of instruction CMASK generates conditional-move mask GSRMASK having a value of 0xf03e086a and as a result field gsr.mask stores the value 0xf03e086a. Embodiments of generating conditional-move mask GSRMASK are described more completely below. The value here is chosen only for the purpose of illustration of the operation of instruction bshuffle.

The values in floating point register A and in floating point register B (FIG. 6) are concatenated and the bytes in the concatenated value numbered in hexadecimal from 0 to F. as shown. The value in bytes 0 to 7 of floating point register destination register A bshuffle B are selected from the concatenated value using the value of conditional-move mask GSRMASK.

Figure 5A:
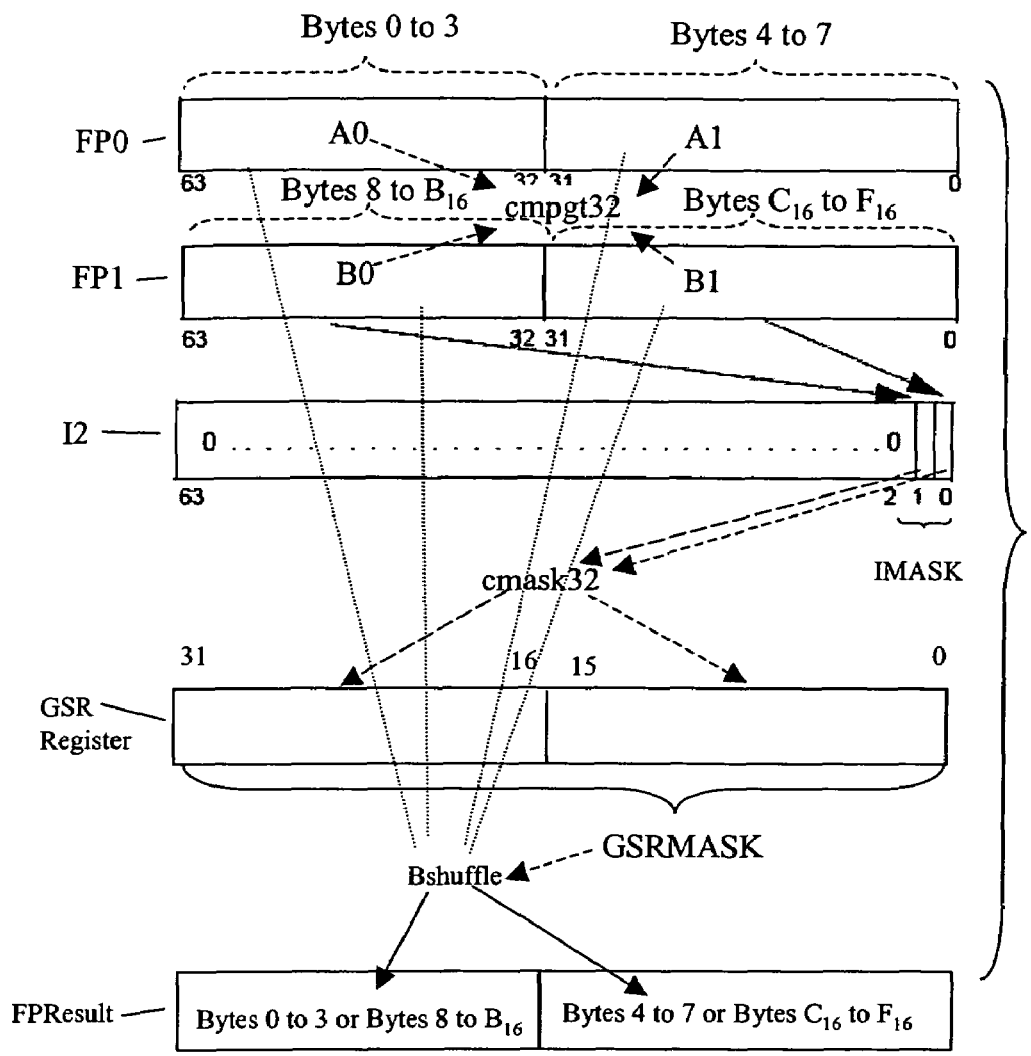
FIG. 5A illustrates the various operation used in implementing a maximum function according to one embodiment of the present invention.

With this background on instruction bshuffle, following completion of execution of conditional-move mask instruction CMASK (FIG. 5A), instruction bshuffle is executed to move the proper operands into floating point result register FPResult using conditional-move mask GSRMASK. In execution of instruction bshuffle, the values in floating point registers are concatenated and the bytes in the concatenated value are numbered from 0 to $F_{16}$, as shown in FIG. 5A. Specifically, the field storing operand A0 includes bytes 0 to 3; the field storing operand A1 includes bytes 4 to 7; the field storing operand B0 includes bytes 8 to $B_{16}$; the field storing operand B1 includes bytes $C_{16}$ to $F_{16}$. (Herein, a subscript 16 next to a character, e.g., $B_{16}$, is used to indicate a hexadecimal number.)

Thus, either bytes 0 to 3 or bytes 8 to $B_{16}$ of the concatenated value, depending on the values in bits 16 to 31 of conditional-move mask GSRMASK, are written to the most significant field in floating point result register FPResult. Similarly, either the values in bytes 4 to 7 or bytes $C_{16}$ to $F_{16}$ of the concatenated value, depending on the values in bits 0 to 15 of conditional-move mask GSRMASK, are written to the least significant field in floating point result register FPResult.

In this embodiment, execution of instruction bshuffle moves bytes of data and so conditional-move mask GSR-MASK, which is generated by execution of conditional-move mask instruction CMASK, is configured so that execution of instruction bshuffle selects the appropriate information. In this example, there are embodiments of conditional-move mask instruction CMASK that correspond to compare operations on 8-, 16-, and 32-bit source operands. The compare operation on 8-bit source operands generates an 8-bit integer mask IMASK; the compare operation on 16-bit source operands generates a 4-bit integer mask IMASK; and the compare operation on 32-bit source operands generates a 2-bit integer mask IMASK.

Thus, in this example, there are three embodiments of conditional-move mask instruction CMASK: conditional-move mask instruction CMASK8 that receives the 8-bit integer mask as input; conditional-move mask instruction CMASK16 that receives the 4-bit integer mask as input; and conditional-move mask instruction CMASK32 that receives the 2-bit integer mask as input. In this example, the inputs are contained in the least significant 8-, 4-, and 2-bits respectively of the register storing integer mask IMASK, and the other bits (i) are ignored; and (ii) are set to zero by execution of software in one embodiment.

Table 4 is one representation of the relationship between the values of bits in integer mask IMASK and the values in the corresponding fields of conditional-move mask GSRMASK.

TABLE 4

| IMASK Bit | Value of IMASK bit | CMASK8 Bits in GSRMASK Field | CMASK8 Value (hex) | CMASK16 Bits in GSRMASK Field | CMASK16 Value (Hex) | CMASK32 Bits in GSRMASK Field | CMASK32 Value (Hex) |
|---|---|---|---|---|---|---|---|
| {0} | 0 | {3:0} | F | {7:0} | EF | {15:0} | CDEF |
|  | 1 | {3:0} | 7 | {7:0} | 67 | {15:0} | 4567 |
| {1} | 0 | {7:4} | E | {15:8} | CD | {31:16} | 89AB |
|  | 1 | {7:4} | 6 | {15:8} | 45 | {31:16} | 0123 |
| {2} | 0 | {11:8} | D | {23:16} | AB |  |  |
|  | 1 | {11:8} | 5 | {23:16} | 23 |  |  |
| {3} | 0 | {15:12} | C | {31:24} | 89 |  |  |
|  | 1 | {15:12} | 4 | {31:24} | 10 |  |  |
| {4} | 0 | {19:16} | B |  |  |  |  |
|  | 1 | {19:16} | 3 |  |  |  |  |
| {5} | 0 | {23:20} | A |  |  |  |  |
|  | 1 | {23:20} | 2 |  |  |  |  |
| {6} | 0 | {27:24} | 9 |  |  |  |  |
|  | 1 | {27:24} | 1 |  |  |  |  |
| {7} | 0 | {31:28} | 8 |  |  |  |  |
|  | 1 | {31:28} | 0 |  |  |  |  |
| {63:8} | — | — | — |  |  |  |  |

As shown in Table 4, for 8-bit source operands, integer mask IMASK is 8-bits, where bit 7 is the most significant bit and bit zero is the least significant bit. The nomenclature used herein is that bit 6 is the second most significant bit, and bit 1 is the second least significant bit.

For 16-bit source operands, integer mask IMASK is 4-bits, where bit 3 is the most significant bit and bit zero is the least significant bit. The nomenclature used herein is that bit 2 is the second most significant bit, and bit 1 is the second least significant bit.

For 32-bit source operands, integer mask IMASK is 2-bits, where bit 1 is the most significant bit and bit zero is the least significant bit. The nomenclature used herein is that bit zero is also the second most significant bit.

The most significant bit in integer mask IMASK corresponds to the most significant field in conditional-move mask GSRMASK; the second most significant bit in integer mask IMASK corresponds to the second most significant field in conditional-move mask GSRMASK, and so on. In Table 4, for a particular embodiment of the conditional-move mask instruction, the most significant field is at the bottom of the column and includes bit 31.

Similarly, the least significant bit in integer mask IMASK corresponds to the least significant field in conditional-move mask GSRMASK. In Table 4, for a particular embodiment of the conditional-move mask instruction, the least significant field is at the top of the column and includes bit 0.

Also, in Table 4, each field of conditional-move mask GSRMASK for 16- and 32-bit source operands includes a plurality of sub-fields. In this embodiment, each sub-field is four-bits in size.

As shown in Table 4, for 8-bit source operands, when bit 3 of integer mask IMASK is zero, e.g., has a first state, the corresponding field of conditional-move mask GSRMASK, bits {15:12}, identifies byte $C_{16}$ of the concatenated value described above.

When bit 3 of integer mask IMASK is one, e.g., has a second state, the corresponding field of conditional-move mask GSRMASK, bits {15:12}, identifies byte 4 of the concatenated value described above.

As shown in Table 4, for 16-bit source operands, when bit 3 of integer mask IMASK is zero, e.g., has a first state, the corresponding field of conditional-move mask GSRMASK, bits {31:24}, identifies bytes 8 and 9 of the concatenated value described above. When bit 3 of integer mask IMASK is one, e.g., has a second state, the corresponding field of conditional-move mask GSRMASK, bits {31:24}, identifies bytes 1 and 0 of the concatenated value described above.

Figure 5B:
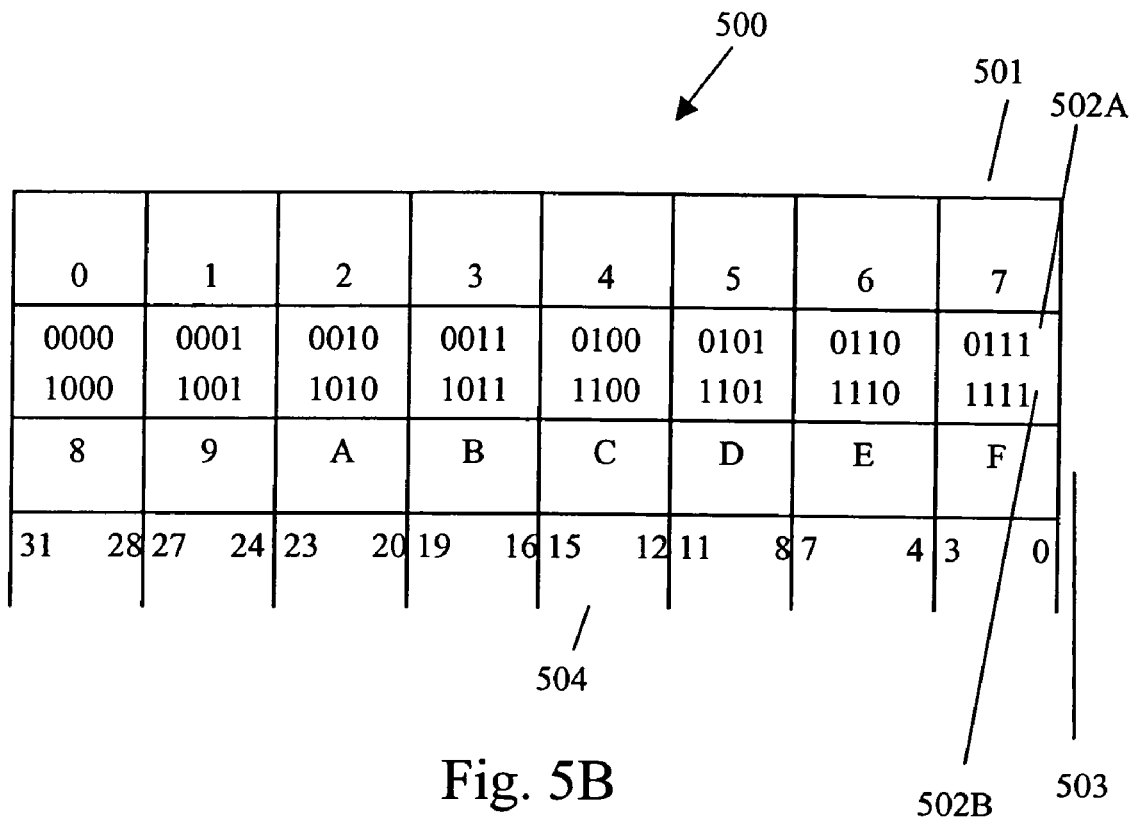
FIG. 5B is a table that illustrates embodiments of a conditional-move mask instruction according to one embodiment of the present invention.

FIG. 5B is another illustration of the information in Table 4. In FIG. 5B, element 500 includes five rows 501, 502A, 502B, 503, and 504. In this embodiment, conditional-move mask GSRMASK is thirty-two bits in size and has eight four-bit sub-fields as shown in row 504. Rows 501 and 503 shows the relationship between bytes in the concatenated value and the corresponding sub-field in conditional-move mask GSRMASK. For example, bits 31 to 28 can identify either byte 0 or byte 8 of the concatenated value for instruction bshuffle (See FIG. 6). Bits 15 to 12 can identify either byte 4 or byte $C_{16}$ of the concatenated value, etc. The particular byte selected depends on the value of the corresponding bit in integer mask IMASK, as indicated in Table 4.

Note that for 8-bit source operands, the subfields of FIG. 5B are the fields of conditional-move mask GSRMASK in Table 4, i.e., the fields and the sub-fields are the same entity for 8-bit source operands. For 16-bit source operands, each field of conditional-move mask GSRMASK includes two sub-fields in FIG. 5B. Similarly, for 32-bit source operands, each field of conditional-move mask GSRMASK includes four sub-fields in FIG. 5B.

Row 502A shows, for each sub-field, the binary value in conditional-move mask GSRMASK for the corresponding byte in row 501. Row 502B shows, for each sub-field, the binary value in conditional-move mask GSRMASK for the corresponding byte in row 503. Comparison of rows 502A and 502B shows that in each field only the most significant bit changes and the three least significant bits are always the same independent of the value of the corresponding bit in integer mask IMASK.

Figure 5C:
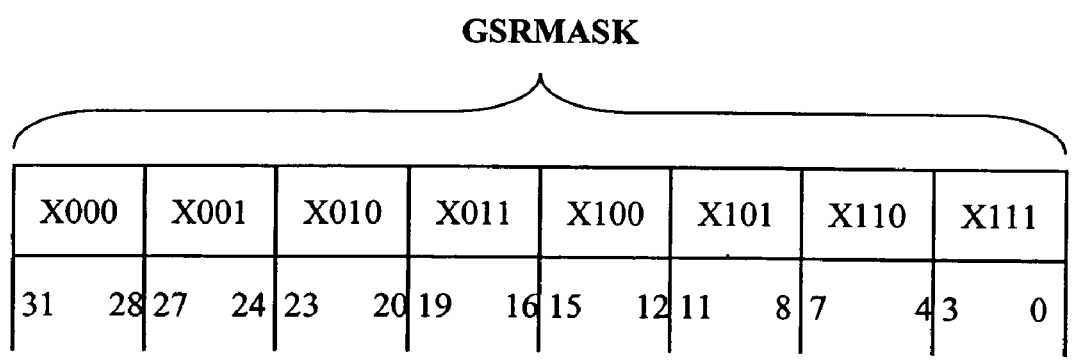
FIG. 5C illustrates the bits in the conditional-move mask that are always the same and the bits whose state is determined from corresponding bits in an integer mask according to one embodiment of the present invention.

Thus, as shown in FIG. 5C, 24 bits of conditional-move mask GSRMASK are always the same. The bit locations indicated by "x" in FIG. 5C change depending on the value of the corresponding bit in integer mask IMASK.

Returning to the example with 32-bit source operands of FIG. 5A, Table 4 shows that when bit 1 of integer mask IMASK is set, e.g. a logical one in this example, bits 31 to 16 identify bytes 0 to 3 of the concatenated value. Thus, the value of "x" in bits 31, 27, 23, and 19 (FIG. 5C) is set to a logical zero, which is the complement of the logical one. Similarly, Table 4 shows that when bit 1 of integer mask IMASK is cleared, e.g. a logical zero in this example, bits 31 to 16 identify bytes 8 to $B_{16}$ of the concatenated value. Thus, the value of "x" in bits 31, 27, 23, and 19 (FIG. 5C) is set to a logical one, which is the complement of the logical zero.

Examination of the other embodiments of conditional-move instruction CMASK shows that in each instance, the values of bits represented by "x" in FIG. 5C are the complement of the value of the corresponding bit in integer mask IMASK. Thus, combinatorial logic is used, in one embodiment, to generate conditional-move mask GSRMASK. Since the combinatorial logic is simple for generating conditional-move mask GSRMASK from integer mask IMASK, the logic can be performed in a single clock cycle.

In the above example, an implementation of a maximum function was used as an illustration. However, the invention is not limited to any particular function, any particular SIMD instructions, any particular register size, or to any specific operand sizes that are packed into the registers. In view of this disclosure, one of skill in the can implement operations utilized for any SIMD operation and for any register size and operand size or sizes of interest and utilize the condition-move mask instruction to convert a mask in an integer register into a conditional-move mask. Further, the use of particular registers to store the source operands and the various masks is illustrative only and is not intended to limit the invention to the particular registers indicated. For example, SIMD registers could be used in place of the floating-point registers.

Figure 7:
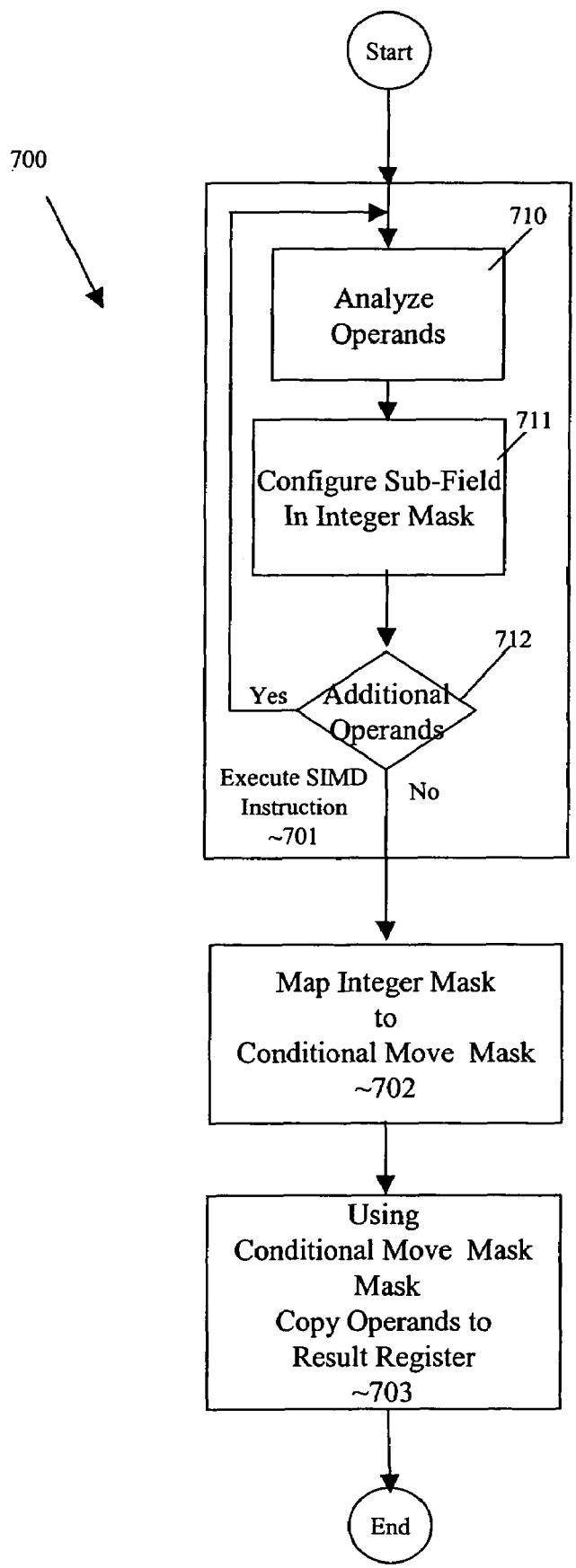
FIG. 7 is a process flow diagram for a method according to one embodiment of the present invention.

FIG. 7 is a process flow diagram for a general application of one embodiment of this invention. In method 700, a SIMD instruction is executed in execute SIMD operation 701. In this embodiment, analyze operands operation 710 performs the operation specified in the SIMD instruction on a set of operands from a plurality of operands packed in a plurality of registers, and then transfers to configure sub-field in integer mask operation 711.

Operation 711 configurations a value of a sub-field in the integer mask corresponding to the set of operands to indicate the result of the specified operation on the set of operands and then transfers to additional operands check operation 712. Additional operands check operation 712 determines whether all the operands have been processed. If all the operands in the plurality of operands have been processed, processing transfers to map integer mask to conditional-move mask operation 702, and otherwise returns to analyze operands operation 710.

Operations 710 to 712 are repeated until all the operands have been processed and integer mask IMASK for the operation is complete. After all the operands have been processed, operation 702 is performed.

Map integer mask to conditional-move mask operation 702 reads the value of the integer mask IMASK generated by operation 701 and converts integer mask IMASK to a conditional-move mask GSRMASK that is written to a register. As explained above, the conversion is done, in one embodiment, using simple combinatorial logic. Upon generation of conditional-move mask GSRMASK, operation 702 transfers to using conditional-move mask copy operands to result register operation 703.

Operation 703 uses conditional-move mask GSRMASK to select operands from the plurality of operands and copies each selected operand to a result register. The operands are copied into the result register so as to generate the proper result.

Consider the following computer code segment:
cmpxx X1, Y1, I1
cmpxx X2, Y2, I2
cmpxx X3, Y3, I3
cmpxx X4, Y4, I4
cmpxx X5, Y5, I5
. . .
Cmask I1
bshuffle X1, Y1, FP1 where xx is any of the comparisons described above, e.g., "greater than," "less than or equal to," "equal," "not equal," "less than," and "greater than or equal to."

Using method 700, each of the compare instructions can execute concurrently, because each of the compare instructions is writing integer mask IMASK for the corresponding compare operation to a different general-purpose integer register. Thus, method 700 facilitates software pipelining. Also, only registers operations are utilized so that the scratch memory and memory operations of the prior art are unnecessary.

Figure 8:
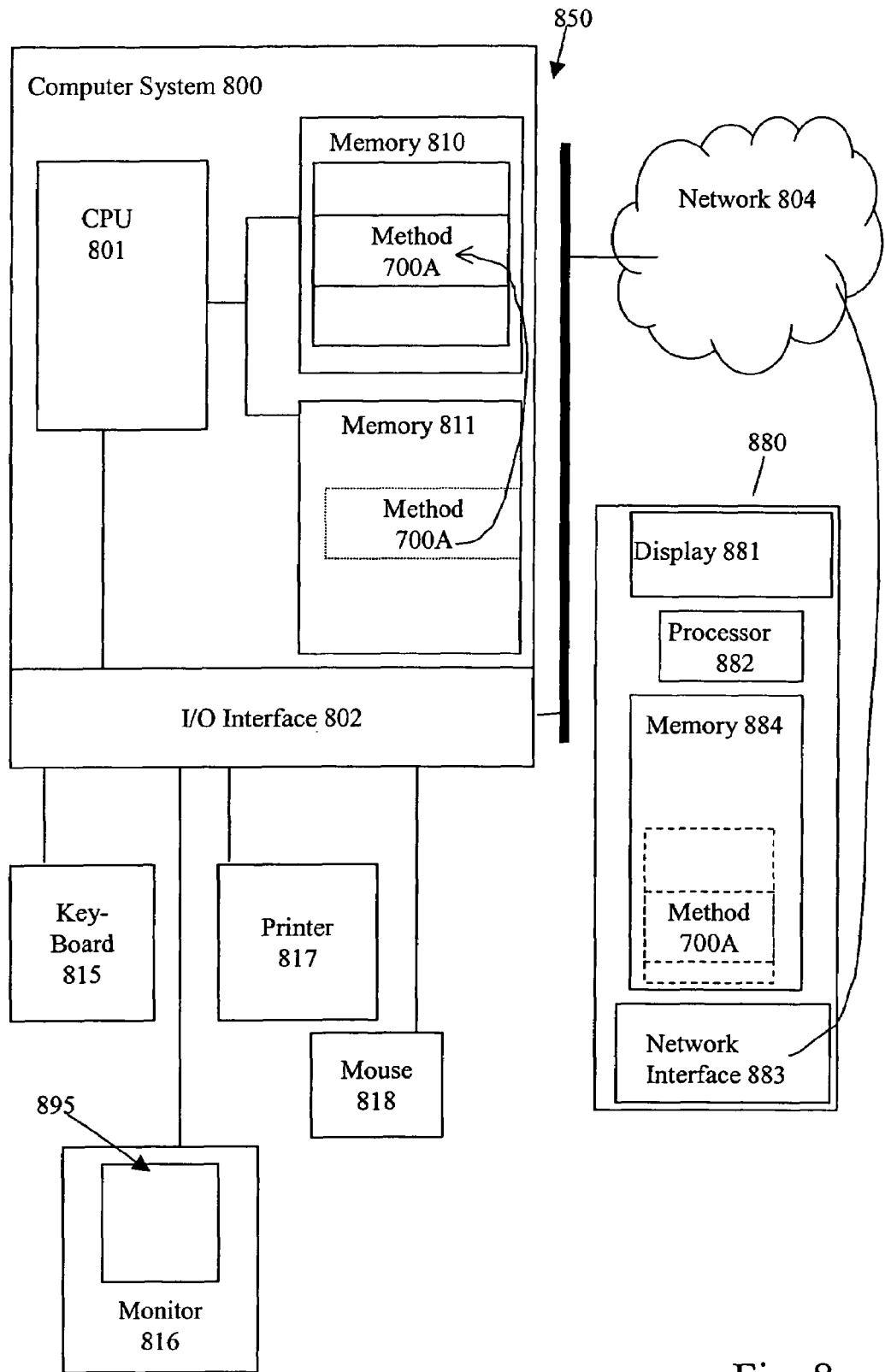
FIG. 8 is an illustration of one embodiment of various structures and systems that utilizes the embodiments of the method of the present invention.

Method 700 (FIG. 7), which is represented as method 700A in FIG. 8, is applicable to a hardware configuration like a personal computer or workstation as illustrated schematically in FIG. 8 by computer system 800. In this example, computer system 800 includes a CPU 801, volatile memory 810, non-volatile memory 811, an I/O interface 802, a keyboard 815, a monitor 816, a printer 817, and a mouse 818.

An embodiment of the invention, however, may also be applied to a client-server configuration 850 that also is illustrated in FIG. 8. For example, the operations of method 700A are carried out on a server computer 880 accessible by the client device 800 over a data network 804, such as the Internet, using a browser application or the like. In this example, server computer 880 includes a display 881, a processor 882, a memory 884, and a network interface 883.

Herein, a computer program product comprises a medium configured to store or transport computer readable code for method 700A or in which computer readable code for method 700A is stored. Some examples of computer program products are CD-ROM discs, ROM cards, floppy discs, magnetic tapes, computer hard drives, servers on a network and signals transmitted over a network representing computer readable program code.

As illustrated in FIG. 8, this storage medium may belong to computer system 800 itself. However, the storage medium also may be removed from computer system 800. For example, computer instructions for method 700A may be stored in memory 884 that is physically located in a location different from processor 801. The only requirement is that processor 801 is coupled to the memory containing method 700A. This could be accomplished in a client-server system 850, e.g., system 800 is the client and system 880 is the server, or alternatively via a connection to another computer via modems and analog lines, or digital interfaces and a digital carrier line.

For example, memory 884 could be in a World Wide Web portal, while display unit 816 and processor 801 are in a personal digital assistant (PDA), or a wireless telephone, for example. Conversely, the display unit and at least one of the input devices could be in a client computer, a wireless telephone, or a PDA, while the memory and processor are part of a server computer on a wide area network, a local area network, or the Internet.

More specifically, computer system 800, in one embodiment, can be a portable computer, a workstation, a two-way pager, a cellular telephone, a digital wireless telephone, a personal digital assistant, a server computer, an Internet appliance, or any other device that includes components that can execute method 700A. Similarly, in another embodiment, computer system 800 can be comprised of multiple different computers, wireless devices, cellular telephones, digital telephones, two-way pagers, or personal digital assistants, server computers, or any desired combination of these devices that are interconnected to perform, method 700A as described herein. Hence, when method 700A is performed on any one or any combinations of these devices, method 700A is a computer-based method.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

In yet another embodiment, method 700A is stored in memory 884 of system 880. Stored method 700A is transferred, over network 804 to memory 811 in system 800. In this embodiment, network interface 883 and I/O interface 802 would include analog modems, digital modems, or a network interface card. If modems are used, network 804 includes a communications network, and method 700A is downloaded via the communications network.

Method 700A of the present invention may be implemented in a computer program. Such a computer program may be stored on any common data carrier like, for example, a floppy disk or a compact disc (CD), as well as on any common computer system's storage facilities like hard disks. Therefore, embodiments of the present invention also relate to a data carrier for storing a computer program including instructions for carrying out an embodiment of the inventive method. Embodiments of the present invention also relate to a method for using a computer system for carrying out an embodiment of the present inventive method. Embodiments of the present invention further relate to a computer system with a storage medium on which a computer program for carrying out an embodiment of the present inventive method is stored.

In one embodiment, a computer based method includes:
executing a first SIMD compare instruction for a first plurality of operands in a first register and a second plurality of operands in a second register wherein a result of said first SIMD compare operation is stored in a mask field of a first general-purpose integer register; and
executing, concurrently with said first executing, a second SIMD compare instruction for a third plurality of operands in a third register and a fourth plurality of operands in a fourth register wherein a result of said second SIMD compare operation is stored in a mask field of a second general-purpose integer register.

A structure for this embodiment includes:
means for executing a first SIMD compare instruction for a first plurality of operands in a first register and a second plurality of operands in a second register wherein a result of said first SIMD compare operation is stored in a mask field of a first general-purpose integer register; and
means for executing, concurrently with said first means for executing, a second SIMD compare instruction for a third plurality of operands in a third register and a fourth plurality of operands in a fourth register wherein a result of said second SIMD compare operation is stored in a mask field of a second general-purpose integer register.

A computer program product for this embodiment has embedded therein computer readable instructions for a method including:
executing a first SIMD compare instruction for a first plurality of operands in a first register and a second plurality of operands in a second register wherein a result of said first SIMD compare operation is stored in a mask field of a first general-purpose integer register; and
executing, concurrently with said first executing, a second SIMD compare instruction for a third plurality of operands in a third register and a fourth plurality of operands in a fourth register wherein a result of said second SIMD compare operation is stored in a mask field of a second general-purpose integer register.

Yet another structure includes:
means for generating a mask wherein said means for generating said mask includes:
means for executing a single instruction multiple data instruction on a plurality of operands stored in a first plurality of registers on a processor; and
means for storing said mask in an available register wherein said available register is one of a second plurality of registers on said processor;
means for generating a conditional-move mask in another register on said processor using said mask; and
means for using said conditional-move mask in selecting operands from said plurality of operands to generate a result in yet another register on said processor.

We claim:

1. A computer-based method comprising:
generating a mask wherein said generating said mask includes:
executing a single instruction multiple data instruction on a plurality of operands stored in a first plurality of registers on a processor to generate said mask; and
storing said mask in an available register wherein said available register is one of a second plurality of registers on said processor;
generating a conditional-move mask in another register on said processor using said mask; and
using said conditional-move mask in selecting operands from said plurality of operands to generate a result in yet another register on said processor.

2. The computer-based method of claim 1 wherein said generating a mask further comprises:
comparing at least a first operand and a second operand in a first register in said first plurality of registers with at least a third operand and a fourth operand in a second register in said first plurality of registers wherein
said first operand is compared with said third operand;
said second operand is compared with said fourth operand;
said first operand is stored in a most significant field in said first register;
said second operand is stored in a second most significant field in said first register;
said third operand is stored in a most significant field in said second register; and
said fourth operand is stored in a second most significant field in said second register.

3. The computer-based method of claim 2 wherein said generating a mask further at least comprises
configuring a state of a most significant bit in said mask based upon a result of said comparison of said first and third operands; and configuring a state of a second most significant bit in said mask based upon a result of said comparison of said second and fourth operands.

4. The computer-based method of claim 3 wherein said generating a conditional-move mask further at least comprises
using said state of said most significant bit in said mask in configuring a most significant field in said conditional-move mask.

5. The computer-based method of claim 4 wherein said generating a conditional-move mask further at least comprises
using said state of said second most significant bit in said mask in configuring a second most significant field in said conditional-move mask.

6. The computer based method of claim 5 wherein said using said conditional-move mask in selecting operands from said plurality of operands to generate a result in yet another register further comprises:
copying an operand from one of said first and second registers to said result register based on a value in said most significant field of said conditional-move mask.

7. The computer-based method of claim 1 wherein said generating a conditional-move mask further at least comprises
using a state of a bit in said mask to determine a state of a bit in a field of said conditional-move mask wherein said field of said conditional-move mask corresponds to said bit in said mask.

8. The computer-based method of claim 7 wherein said state of said bit in said corresponding field of said conditional-move mask is a logical inversion of said state of said bit in said mask.

9. The computer-based method of claim 1 wherein said using said conditional-move mask in selecting operands from said plurality of operands to generate a result in another register further comprises:
copying an operand from one of said plurality of registers to said yet another register based on a value in a sub-field of said conditional-move mask.

10. The computer-based method of claim 1 wherein said first plurality of registers comprises a plurality of floating point registers.

11. The computer-based method of claim 1 wherein said second plurality of registers comprises a plurality of general purpose integer registers.

12. The computer-based method of claim 1 wherein said yet another register is a floating point register.

13. A computer program product comprising a computer readable storage medium having embedded therein computer readable instructions for a method comprising:
generating a mask wherein said generating said mask includes:
executing a single instruction multiple data instruction on a plurality of operands stored in a first plurality of registers on a processor to generate said mask; and
storing said mask in an available register wherein said available register is one of a second plurality of registers on said processor;
generating a conditional-move mask in another register on said processor using said mask; and
using said conditional-move mask in selecting operands from said plurality of operands to generate a result in yet another register on said processor.

14. A system comprising:
a processor; and
a memory, coupled to said processor, storing instructions for a method comprising:
generating a mask wherein said generating said mask includes:
executing a single instruction multiple data instruction on a plurality of operands stored in a first plurality of registers on a processor to generate said mask; and
storing said mask in an available register wherein said available register is one of a second plurality of registers on said processor;
generating a conditional-move mask in another register on said processor using said mask; and
using said conditional-move mask in selecting operands from said plurality of operands to generate a result in yet another register on said processor.

* * * * *